Patented Mar. 3, 1936

2,032,519

UNITED STATES PATENT OFFICE 2,032,519

CHLORO-BENZOYLAMINO-ANTHRA-QUINONES

Alexander J. Wuertz, Carrollville, and Myron S. Whelen, Milwaukee, Wis., assignors to E. I. du Pont de Nemours & Company, Wilmington, Del., a corporation of Delaware No Drawing. Application June 22, 1934, Serial No. 731,882

6 Claims. (Cl. 260—60)

This invention relates to the preparation of new chloro-benzoylamino-anthraquinone compounds and more particularly to the preparation of dichloro-1-benzoylamino-anthraquinone having the general formula

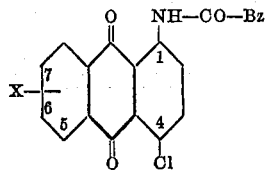

wherein Bz stands for a radical of the benzene series and X represents a chlorine atom in the 5, 6 or 7 position.

We have found that new dichloro-benzoylamino-anthraquinone compounds can be obtained in substantially pure form and in high yields when 5-chloro-1-benzoylamino-anthraquinone or the isomeric 6- and 7-chloro-1-benzoylamino-anthraquinones are chlorinated in nitrobenzene or other high-boiling inert solvent and in the presence of acetic acid and an acid binding agent such as sodium or potassium acetate, and that the dichloro bodies so obtained are valuable intermediates for the preparation of dyestuffs. This general procedure for chlorinating 1-benzoylamino-anthraquinones is more fully described in U. S. Patent 1,963,109 by A. J. Wuertz, wherein it is used more particularly for the preparation of 1-benzoylamino-4-chloro-anthraquinones. It has been found that when acetic acid is used in combination with a high-boiling inert solvent, the chlorination of 1-benzoylamino-anthraquinones proceeds smoothly and the reaction is so slowed down that it is readily controlled to produce substantially pure monochlorination products. In this reaction the chlorination may be carried to completion without danger of overchlorination.

By this procedure it is also possible to start with 1-amino-5-(6 or 7)-monochloro-anthraquinones, which may be benzoylated and then chlorinated without isolation. In all cases the chlorine which is introduced enters the 4 position only and no appreciable amount of isomeric or higher chlorinated products is formed.

Although it is to be understood that other known chlorination methods may be used, the following examples are given to more fully illustrate our preferred process for preparing these new dichloro compounds. The parts used are by weight.

Example 1

Ten parts of 1-amino-5-chloro-anthraquinone are heated with thirty parts of nitrobenzene to 145° C. and six parts of benzoyl chloride are added over one hour at this temperature. The mass is then heated at 145–150° C. for a short period, cooled to about 110° C. and thirty parts of glacial acetic acid and five parts of ground anhydrous sodium acetate are added. The temperature is then adjusted to about 95° C. and chlorine gas is passed in until a chlorine content of an isolated sample is 17.5%. The mass is then cooled, filtered and washed with acetic acid, alcohol and hot water.

1-benzoylamino-4,5-dichloro-anthraquinone is obtained as a greenish yellow highly crystalline product.

Example 2

Ten parts of 1-amino-6-chloro-anthraquinone are added to thirty parts of nitrobenzene and the whole heated to 145° C. At this temperature there are added six parts of benzoyl chloride over the course of one hour. The mass is then heated at 145–150° C. for a short period, cooled to about 110° C. and thereto are added six parts of anhydrous ground sodium acetate and forty parts of glacial acetic acid. The temperature is then adjusted to about 100° C. and chlorine gas is passed in at this temperature until microscopic examination shows that all plates present have been converted to needles or until a chlorine content of 17.5% has been reached. The mass is cooled, filtered, and washed with acetic acid, alcohol and hot water.

The 1-benzoylamino-4,6-dichloro-anthraquinone is obtained as a bright golden yellow highly crystalline compound having a melting point of 196–198° C.

Example 3

Ten parts of 1-amino-7-chloro-anthraquinone are added to 30 parts of nitrobenzene and the whole is heated to 145° C. at which temperature six parts of benzoyl chloride are added over one hour. The mass is then heated at 145–150° C. for a short period, cooled to about 110° C. and thereto are added six parts of anhydrous ground sodium acetate and thirty parts of glacial acetic acid. The temperature is then adjusted to about 100° C. and chlorine gas is passed in until an isolated sample shows a chlorine content of 17.5%. The mass is cooled, filtered and washed with acetic acid, alcohol and hot water.

The yellow compound obtained is 1-benzoyl-amino-4,7-dichloro-anthraquinone.

Any suitable inert high-boiling organic solvent may be used in the process outlined in the above examples in place of nitrobenzene, for example, trichloro-ethylene, mono-, di- and tri-chlorobenzenes, etc.

While only benzoyl chloride has been mentioned in the specific examples, it is to be understood that substituted benzoyl chlorides, such as methyl, chloro or nitro substituted benzoyl chlorides may also be used and are comprehended within the terms used in the appended claims.

Our invention is not to be limited to the benzoylation and chlorination without isolation, for it is to be understood that the chlorination of already benzoylated chloro-amino-anthraquinones which contain chlorine in the 5, 6 or 7 position may be effected in the same manner, preferably in a high boiling solvent, in the presence of an acid binding agent and acetic acid.

Acetyl-amino-anthraquinones may also be chlorinated in the same manner, the acetyl derivatives being particularly suitable as starting materials where free amino compounds are to be produced after chlorination.

What we claim is:

1. 1 - aroylamino-4,X -dichloro-anthraquinone, wherein X stands for one of the numerals 5, 6 and 7, and wherein the aroyl group is of the benzene series.
2. 1 - benzoylamino- 4,X - dichloro-anthraquinone, wherein X stands for one of the numerals 5, 6 and 7.
3. 1 - benzoylamino - 4,5 - dichloro-anthraquinone.
4. 1 - benzoylamino - 4,6 - dichloro-anthraquinone.
5. 1 - benzoylamino - 4,7 - dichloro-anthraquinone.
6. The process which comprises chlorinating a monochloro-benzoylamino-anthraquinone of the following formula:

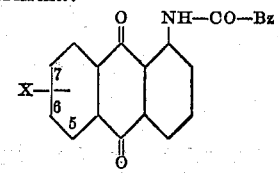

wherein Bz stands for a radical of the benzene series and X represents a chloro atom in the 5, 6 or 7 position; said chlorination being effected in an inert high-boiling organic solvent and acetic acid, and in the presence of an acid binding agent.

ALEXANDER J. WUERTZ.
MYRON S. WHELEN.